June 13, 1967 J. M. S. KEEN ETAL 3,325,088
LUBRICATING MEANS FOR A BEARING
Filed March 17, 1965 2 Sheets-Sheet 1

Inventors
John Michael Storer Keen
Michael Paucher
Ronald Senechall
By Cushman, Darby & Cushman
Attorneys June 13, 1967     J. M. S. KEEN ETAL     3,325,088
LUBRICATING MEANS FOR A BEARING
Filed March 17, 1965     2 Sheets-Sheet 2
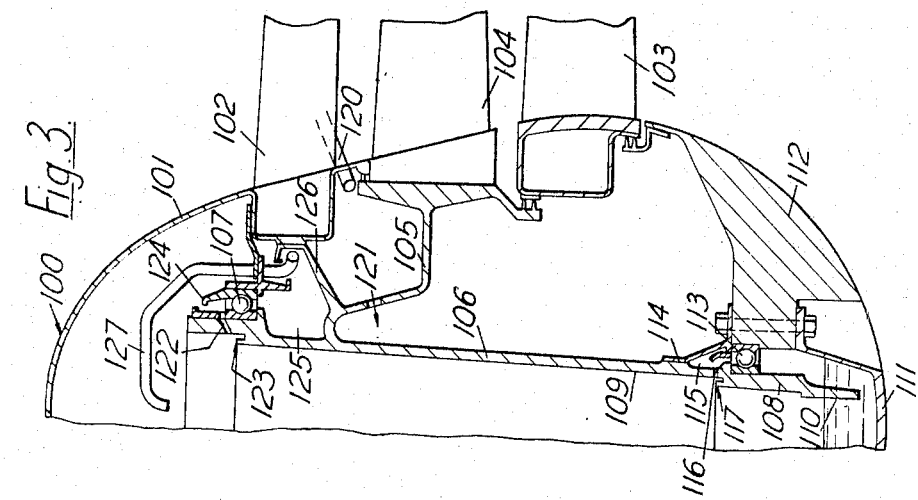
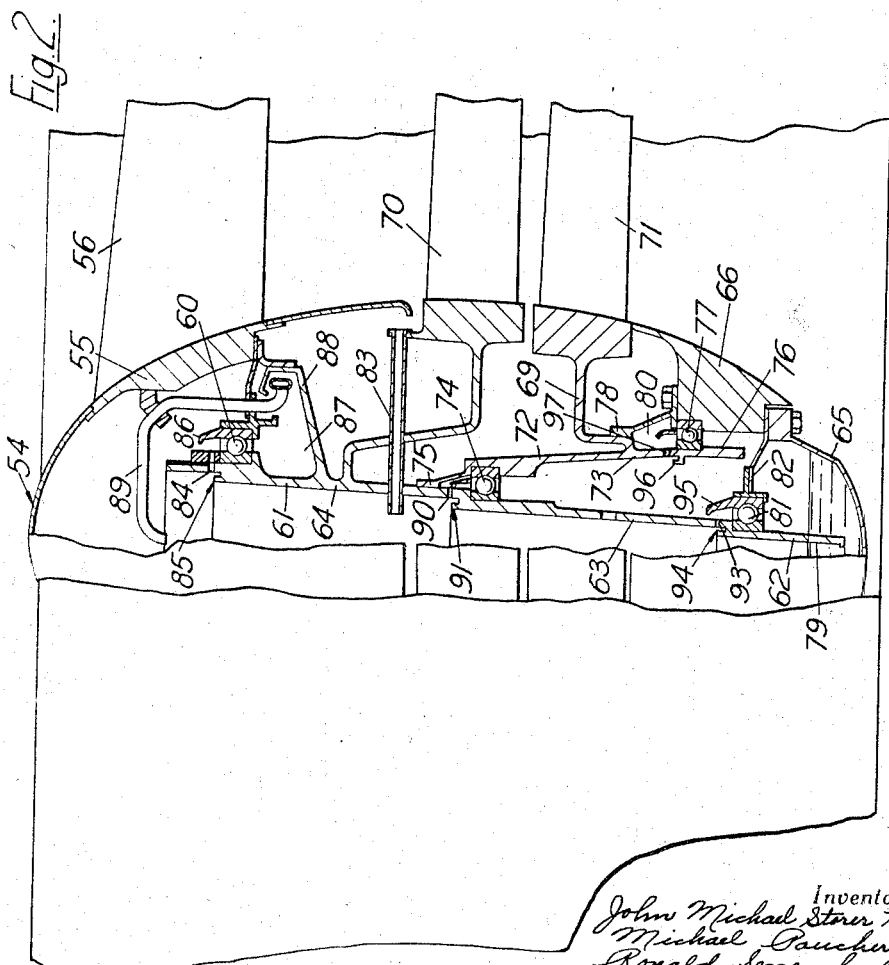
Inventors
John Michael Storer Keen
Michael Poucher
Ronald Seneschall
By Cushman, Darby & Cushman
Attorneys

# United States Patent Office 3,325,088
Patented June 13, 1967

3,325,088
LUBRICATING MEANS FOR A BEARING
John Michael Storer Keen, Derby, Michael Poucher, Allestree, and Ronald Seneschall, Chellaston, England, assignors to Rolls-Royce Limited, Derby, England, a company of Great Britain
Filed Mar. 17, 1965, Ser. No. 440,528
Claims priority, application Great Britain, Mar. 19, 1964, 11,762/64
4 Claims. (Cl. 230—123)

ABSTRACT OF THE DISCLOSURE

A bearing assembly comprising two relatively rotatable parts having at least a pair of bearings axially spaced from each other therebetween, one of the parts being a shaft having an inner surface which is outwardly inclined towards one of the bearings and an outer surface which is outwardly inclined towards the other bearing, both of the inclined surfaces being capable of forcing lubricant by centrifugal force toward the respective bearings, there being a seal between the relatively rotating parts having a gas flowing therethrough in a direction to prevent leakage of the lubricant through the seal.

---

Figure 1:
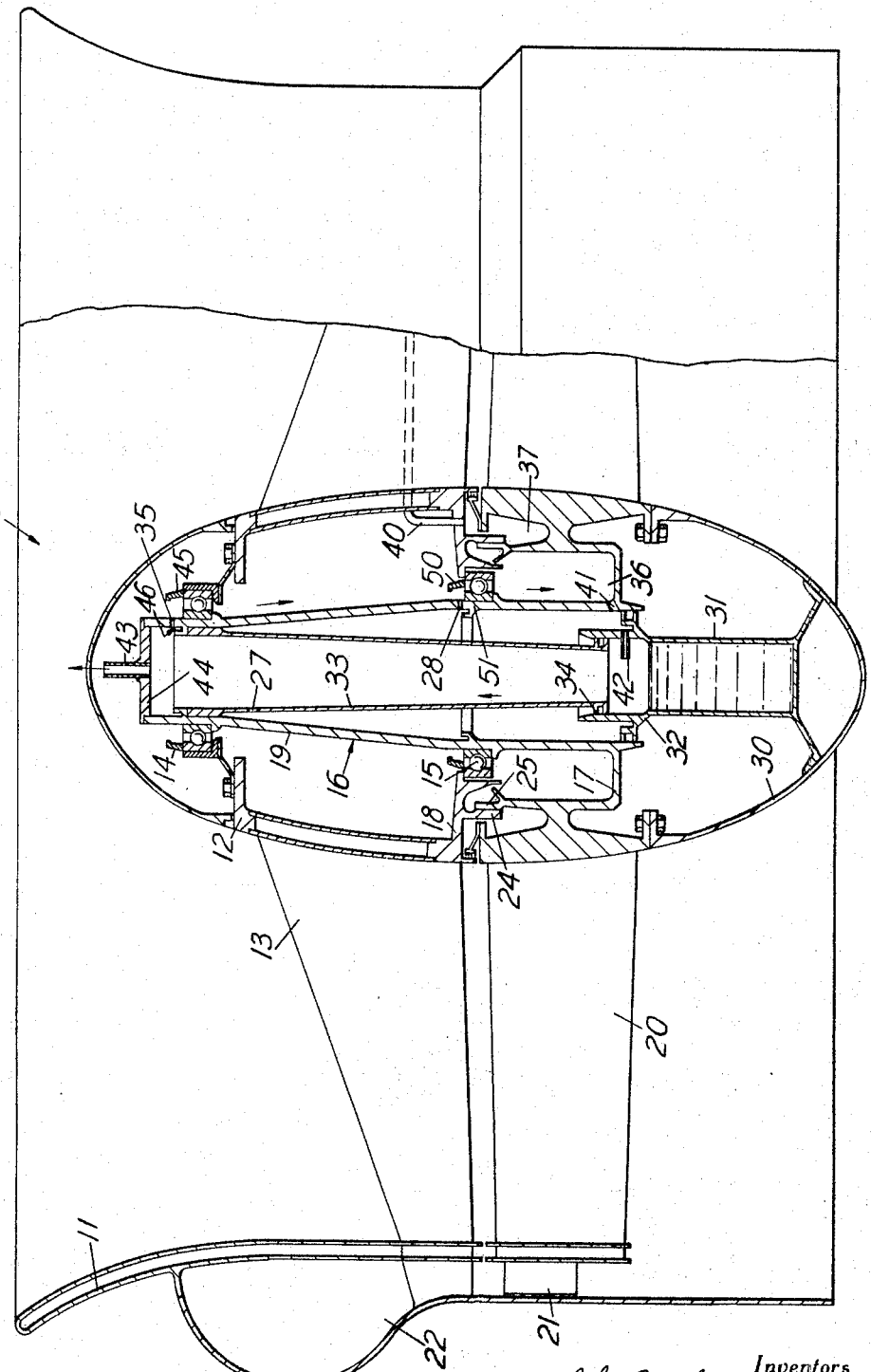

This invention concerns a bearing assembly, and although the invention is not so restricted, it is more particularly concerned with a bearing assembly for use in a ducted fan which may be employed on an aircraft for vertical lift purposes.

According to the present invention, there is provided a bearing assembly comprising two relatively rotatable parts one of which is mounted within a bearing carried by or formed integrally with the other part, lubricant supply means for supplying a lubricant to said bearing, a seal for sealing said relatively rotatable parts to each other, said seal being open to a flow therethrough, in a predetermined direction, of lubricant which has passed through or is being supplied to the bearing, and means for establishing a flow of air or gas through said seal in the opposite direction so as to prevent leakage of lubricant therethrough.

Thus, means may be provided for supplying air or gas under pressure to the side of said seal remote from said bearing. Additionally, or alternatively means may be provided for reducing the air or gas pressure on the side of said seal adjacent said bearing.

The inner of the two relatively rotatable parts is preferably rotatable and has a surface which is radially outwardly inclined towards the said bearing, the lubricant supply means being arranged to supply lubricant to said surface at a point remote from said bearing so that said lubricant may be forced centrifugally over said surface to said bearing. Thus, the said inner part may be constituted by shafting whose inner surface constitutes the said radially outwardly inclined surface, the shafting being provided adjacent said bearing with one or more openings through which the lubricant may pass to the bearing.

One of the said relatively rotatable parts may also be mounted in a further bearing which is spaced axially from the first-mentioned bearing, one of the two bearings being lubricated by lubricant which has passed through the other bearing.

Moreover, one of the said relatively rotatable parts may also be mounted in an additional bearing which is supplied with lubricant from a lubricant reservoir, lubricant which has passed through the said additional bearing passing back to the lubricant reservoir through a syphon tube.

The invention also comprises a ducted fan provided with a bearing assembly as set forth above, the fan having at least one rotor stage carried by a said relatively rotatable part.

The invention is illustrated, merely by way of example, in the accompanying drawings, in which:

FIGURE 1 is an elevation, partly in section, of a ducted fan provided with a bearing assembly according to the present invention, and FIGURES 2 and 3 are broken-away sectional elevations of modified ducted fans incorporating bearing assemblies according to the present invention.

Referring first to FIGURE 1, a ducted fan 10 is adapted to be employed on an aircraft (not shown) for vertical lift purposes. The fan 10 has a fixed outer casing 11 and an inner casing a part 12 of which is connected to the outer casing 11 by a plurality of angularly spaced apart radially extending inlet guide vanes 13.

Mounted within and carried by the part 12 of the inner casing are an upper bearing 14 and a lower bearing 15 which are axially spaced from each other, the bearing 15 being mounted within an annular wall member 18.

Rotatably mounted within the bearings 14, 15 is a shaft 16. The shaft 16, whose upper end is disposed adjacent the bearing 14, has a frusto-conical portion 19 whose external surface is radially outwardly inclined from the bearing 14 to the bearing 15. The shaft 16 has a flange 17 which is connected to fan blades 20 of a fan rotor stage, each of the blades 20 being provided at its tip with a tip turbine blade 21. A chamber 22 is mounted externally on the casing 11 and is adapted to be supplied with gas from a gas generator (not shown). Gas from the chamber 22 may pass out through the tip turbine blades 21 so as to effect rotation of the fan blades 20 and hence of the shaft 16.

The wall member 18 has an axially extending annular flange 24 which forms part of a seal whose other part is formed by an annular portion 25 of the flange 17.

The flange 17 is bolted to a nose cone 30 within which is mounted a cylindrical lubricant reservoir 31. The lubricant reservoir 31 thus rotates in unison with the shaft 16 to which it is sealed by a seal 32.

Mounted within and secured to the shaft 16 is a shaft 33 whose lower end is mounted within and sealed to the reservoir 31 at a seal 34.

The shaft 33 whose upper end is disposed adjacent the bearing 14, is of frusto-conical shape, its external surface being radially outwardly inclined towards its upper end. Thus, in operation, lubricant from the lubricant reservoir 31 travels upwardly over the internal surface of the shaft 33 under the action of centrifugal force and then passes radially outwardly through a plurality of drillings 27, 35 in the shaft 16, the lubricant which has passed out through the drillings 35 passing to the bearing 14.

The lubricant which has passed through the drillings 27, after travelling over the internal surface of the frusto-conical portion 19 of the shaft 16, both under the action of gravity, and under the action of centrifugal force, passes through drillings 28 in the shaft 16 to the bearing 15.

Lubricant which has passed through the bearing 15 flows into an annular chamber 36 whose walls are defined by the shaft 16, flange 17 and annular wall member 18. An annular chamber 37 surrounds the anular chamber 36 and is separated therefrom by the seal 24, 25. The annular chamber 37 is supplied by way of a pipe 40 with air under pressure from the said gas generator (not shown). Thus the air under pressure is supplied to the side of the seal 24, 25 remote from the bearing 15.

Accordingly, any lubricant which has passed into the annular chamber 36, is prevented from leaking outwardly through the seal 24, 25 by the inward flow of air from the annular chamber 37 and through the seal 24, 25 into the annular chamber 36.

Lubricant and air from the annular chamber 36 may pass through apertures 41 in the shaft 16 and through a tube 42 which extends into the lubricant reservoir 31 above the level of the lubricant therein. The lubricant is thus returned to the lubricant reservoir 31. The air which has passed through the tube 42 flows up through the centre of the shaft 33 and escapes through a breather tube 43 which is mounted in an end cap member 44 at the top of the shaft 16.

A flanged member 45 is mounted above the bearing 14 so as to form a lubricant catcher which is supplied with lubricant through the drillings 35 and which directs the lubricant to the bearing 14.

Similarly, a flanged member 50 is mounted above the bearing 15 so as to form a lubricant catcher which is supplied with lubricant through the drillings 28 and which directs the lubricant to the bearing 15.

The shaft 16 is flanged internally to form lubricant traps 46, 51 adjacent the bearings 14, 15 respectively. The existence of lubricant in the lubricant traps 46, 51, will ensure that the bearings 14, 15 respectively are lubricated immediately the fan 10 is brought into operation.

In FIGURE 2 there is shown a ducted fan 54 having an outer casing (not shown) which is connected to a part 55 of an inner casing by a plurality of radially extending annularly spaced apart inlet guide vanes 56.

Mounted within and carried by the part 55 of the inner casing is a bearing 60 within which is rotatably mounted a shaft 61. The shaft 61 has three axially consecutive surfaces 62, 63, 64, each of which is radially outwardly inclined from its lower to its upper end. The surface 62 extends into a pool of lubricant in a static lubricant reservoir 65, the latter being bolted to a part 66 of the inner casing of the ducted fan 54.

The ducted fan 54 has two contra-rotating stages of fan blades 70, 71, which are driven by tip turbine blades (not shown). The blades 70 are connected to the shaft 61 while the blades 71 are connected to a flange 69 of a shaft 72. The shaft 72 has an internal surface 73 which is radially outwardly inclined from its upper towards its lower end. The shaft 72 carries, adjacent its said upper end, a bearing 74 within which the shaft 61 is rotatably mounted. The shaft 72 is provided above the bearing 74 with a sealing member 75 which forms a seal with the shaft 61.

The shaft 72 has an external surface 76 on which is mounted the inner race of a ball bearing 77 whose outer race is carried by the part 66. The part 66 is provided with a sealing member 78 which is sealed to the flange 69, and which forms a chamber 80 with the shaft 72.

The shaft 61 is rotatably mounted adjacent its lower ends in a ball bearing 81 which is carried from the lubricant reservoir 65 by way of a wall member 82.

Three equi-spaced tubes 83 (only one shown) communicate at their radially inner ends with the interior of the shaft 61. When the fan 54 is in operation, air will therefore be drawn from the interior of the shaft 61 and out radially through the tubes 83.

When the fan 54 is in operation, the rotation of the shaft 61, which is provided internally with paddles 79, will cause oil from the lubricant reservoir 65 to climb under centrifugal force up the surfaces 62, 63, 64. The lubricant which has reached a lubricant trap 85 at the top of the surface 64 will pass radially outwardly through holes 84 in the shaft 61 to a lubricant catcher 86 which directs the lubricant to the bearing 60.

The lubricant will pass through the bearing 60 to a chamber 87 which is disposed below the bearing 60. The chamber 87 is defined in part by a radially outwardly inclined wall 88 up which will travel any lubricant which has reached the chamber 87. Lubricant which has passed to the radially outermost part of the chamber 87 will be returned to the lubricant reservoir 65 by way of a syphon tube 89.

Lubricant which has passed to a lubricant trap 91 at the top of the surface 63 will pass through holes 90 in the shaft 61 so as to flow to the bearing 74.

It will be appreciated that the sealing member 75 is open to lubricant being supplied to the bearing 74. Any tendency, however, for such lubricant to leak out past the sealing member 75 in a direction away from the bearing 74 will be opposed by virtue of the fact that the air pressure above the sealing member 75 will be higher than that below the sealing member 75. This will be so for the reason that the space below the sealing member 75 communicates with the interior of the shaft 61, and the pressure in the latter will have been reduced by the air withdrawn through the tubes 83. Any tendency therefore for lubricant to pass through the sealing member 75 will be opposed by the air flow therethrough.

Lubricant which has reached a lubricant trap 94 at the top of the surface 62 will pass through holes 93 in the shaft 61, so as to flow to a lubricant catcher 95 and so to the bearing 81. Lubricant which has passed through the bearing 81 is returned to the lubricant reservoir 65.

The lubricant which has passed through the bearing 74 travels down the surface 73 under the effect of both gravity and centrifugal force so as to reach a lubricant trap. The lubricant then passes out through drillings 97 in the shaft 72 and thus passes to the bearing 77.

The lubricant which has passed through the bearing 77 may pass into the chamber 80. Such lubricant will not, however, pass outwardly through the sealing member 78 for the reason that the existence of reduced pressure within the shaft 61 will cause an inward flow of air past the sealing member 77 in the direction of the bearing 76.

The existence of lubricant in the lubricant traps 85, 91, 94, 96, will ensure that the bearings 60, 74, 81 and 77 respectively are lubricated immediately the fan 54 is brought into operation.

In FIGURE 3, there is shown a ducted fan 100, having an inner casing, a part 101 of which is supported from an outer casing (not shown) by a plurality of radially extending angularly spaced apart inlet guide vanes 102. The ducted fan 100 is also provided with a plurality of radially extending angularly spaced apart outlet guide vanes 103. Disposed between the inlet guide vanes 102 and the outlet guide vanes 103 is a stage of fan rotor blades 104, each of which is provided at its tip with a tip turbine (not shown) which is rotated by a supply of gas from a gas generator (not shown). The fan rotor blades 104 are carried by a flange 105 of a shaft 106, the latter being provided internally with paddles 110.

The part 101 carries and has mounted within it a ball bearing 107 within which is rotatably mounted the shaft 106. The shaft 106 has two axially consecutive internal surfaces 108, 109, each of which is radially outwardly inclined towards its upper end.

The surface 108 extends into a pool of lubricant in a lubricant reservoir 111. The lubricant reservoir 111 is carried by a part 112 of the inner casing, the part 112 being provided with a ball bearing 113 within which the shaft 106 is rotatably mounted. A sealing member 114 is secured to the part 112 and forms a chamber 115 with the shaft 106.

Lubricant may, in operation, be forced centrifugally up the surface 108 to a lubricant trap 117 from which the lubricant enters the chamber 115 by way of apertures 116 in the shaft 106. Lubricant which has reached the chamber 115 passes through the bearing 113 so as to return to the lubricant reservoir 111.

A tube 120 supplies gas under pressure from the said gas generator (not shown) to the region internally of and above the fan rotor blades 104. This gas then passes through apertures 121 in the flanges 105 and flows past the sealing member 114, so as to flow through the apertures 116 and thus flow out through the upper end of the shaft 106. This flow of gas past the sealing member 114 will oppose any leakage of lubricant past the sealing member 114.

The lubricant which has been forced centrifugally up the surface 109 reaches a lubricant trap 123 at the top thereof. The lubricant will then pass through apertures 122 in the shaft 106 to a lubricant catcher 124 and so to the bearing 107. Lubricant from the bearing 107 may pass to a chamber 125 which has a wall 126 which is radially outwardly inclined. The lubricant will thus, in operation, be forced centrifugally into the radially outermost part of the chamber 125 from which it will be returned to the lubricant reservoir 111 by way of a syphon tube 127.

The existence of lubricant in the lubricant traps 117, 123 will ensure that the bearings 113, 107 respectively are lubricated immediately the fan 100 is brought into operation.

We claim:

1. A bearing assembly comprising two relatively rotatable parts, a bearing carried by one said part, the other part being mounted within said one part, lubricant supply means supplying a lubricant to said bearing, a seal sealing said relatively rotatable parts to each other, said seal being open to a flow therethrough, in a predetermined direction, of said bearing lubricant, means establishing a flow of gas through said seal in the opposite direction whereby to prevent leakage of lubricant therethrough, an additional bearing mounted in one said part, a lubricant reservoir supplying a lubricant to said additional bearing and a syphon tube returning lubricant which has passed through the said additional bearing back to said lubricant reservoir.

2. A ducted fan comprising at least one rotor stage, two relatively rotatable parts, one of said parts carrying said at least one rotor stage and being mounted within the other part, a bearing carried by the said other part, lubricant supply means supplying a lubricant to said bearing, a seal sealing said relatively rotatable parts to each other, said seal being open to a flow therethrough, in a predetermined direction, of said bearing lubricant, means establishing a flow of gas through said seal in the opposite direction whereby to prevent leakage of lubricant therethrough, an additional bearing mounted in said other part, a lubricant reservoir supplying a lubricant to said additional bearing, and a siphon tube returning lubricant which has passed through said additional bearing back to said lubricant reservoir.

3. A ducted fan as claimed in claim 2 in which the fan has two contra-rotating rotor stages which are respectively carried by the two relatively rotatable parts.

4. A bearing assembly comprising an outer part, a hollow shaft which is rotatably mounted within the outer part, a first bearing carried between said shaft and said outer part, said shaft having an inner surface which is radially outwardly inclined towards said first bearing, lubricant supply means supplying a lubricant to said surface at a point thereon remote from said first bearing to force lubricant centrifugally over said inner surface to said first bearing, a seal sealing said shaft and the outer part to each other, said seal being open to a flow therethrough, in a predetermined direction, of said bearing lubricant, means establishing a flow of gas through said seal in the opposite direction to thereby prevent leakage of lubricant therethrough, and a second bearing mounted between said shaft and said outer part and spaced axially from the first bearing, the shaft having an outer radially outwardly inclined surface over which lubricant is forced centrifugally to the second bearing after passing through the first bearing.

References Cited

UNITED STATES PATENTS

| 2,067,123 | 1/1937 | Hait | 308—187 |
| 2,125,446 | 8/1938 | Hurtt | 308—36.3 |
| 2,266,107 | 12/1941 | Waterfill | 308—36.3 |
| 2,407,807 | 9/1946 | Bentley | 308—36.3 |
| 3,147,913 | 9/1964 | Davies et al. | 308—187 |

MARTIN P. SCHWADRON, *Primary Examiner.*

FRANK SUSKO, *Examiner.*